United States Patent [19]

Stayner

[11] 4,087,401
[45] May 2, 1978

[54] SILICA FLOUR CONTAINING REINFORCED RESIN COMPOSITIONS AND ARTICLES FORMED THEREOF

[76] Inventor: Vance A. Stayner, P.O. Box 63, Sugar Grove, Ill. 60554

[21] Appl. No.: 704,300

[22] Filed: Jul. 12, 1976

[51] Int. Cl.² .................... C08K 3/36; C08K 7/00; C08K 7/20
[52] U.S. Cl. .................................... 260/40 R
[58] Field of Search .................. 260/40 R, DIG. 24

[56] References Cited

U.S. PATENT DOCUMENTS

| | | | |
|---|---|---|---|
| 2,751,775 | 6/1956 | Sergovic | 260/40 R |
| 3,090,764 | 5/1963 | Ellis et al. | 260/DIG. 24 |
| 3,227,665 | 1/1966 | Fourcode et al. | 260/40 R |
| 3,764,456 | 10/1973 | Woodhams | 260/40 R |
| 3,873,475 | 3/1975 | Pechacek et al. | 260/40 R |
| 3,920,603 | 11/1975 | Stayner et al. | 260/40 R |

*Primary Examiner*—Sandra M. Person
*Attorney, Agent, or Firm*—John L. Parker

[57] ABSTRACT

Reinforced synthetic polyester resin compositions are provided having 10 to 60 percent by weight of resin, 1 to 30 percent by weight of glass spheres, 10 to 60 percent by weight of Suzorite mica platelets, and 20 to 70 percent by weight of silica flour. The compositions may be applied to a mold or to a plastic sheet. They do not require glass fibers, and thus avoid the laborious rolling down of fibers carried on the surface of freshly applied glass fiber-resin compositions. Yet, articles formed from the compositions of the invention retain or improve upon the physical properties inherent in glass fiber-resin compositions. In particular, the compositions and articles are found to be fire retardant.

5 Claims, No Drawings

SILICA FLOUR CONTAINING REINFORCED RESIN COMPOSITIONS AND ARTICLES FORMED THEREOF

DESCRIPTION OF THE INVENTION

This invention relates generally to silica flour containing reinforced resin compositions and articles formed thereof, and more particularly concerns such compositions and articles having improved physical and application properties.

Various techniques have been employed in reinforcing polyester resins to form construction materials having desirable strength, impact resistance, and other properties necessary for a large variety of products such as boats, bathtubs, furniture and the like. Typically, a mold of the desired product shape is sprayed with a gel coat, polyester resin and reinforcing glass fibers are sprayed onto the coated mold to build up a thickness sufficient to provide structural integrity, the resin is cured, and finally the molded reinforced resin product is released from the mold. In other applications, the polyester resin and reinforcing glass fibers are sprayed onto sheets of synthetic resins.

One such process is that disclosed in Stayner U.S. Pat. No. 3,582,388, in which the resin composition includes glass fibers, glass beads and an inert organic solvent diluent for the resin. Another prior art process is exemplified by Brown U.S. Pat. No. 3,158,528 in which the resin composition includes glass flakes and mica particles. Still another process, disclosed in Canadian Pat. No. 893,163, concerns a resin composition incorporating mica platelets.

In conventional spraying systems, a spray gun such as the "Glas-Craft" gun is employed. Typically, the gun pumps resin through one orifice, pumps catalyst through another orifice, mixes them together and sprays the mixture out a nozzle and against a mold or plastic sheet. On top of the gun there is an air motor which drives a chopper, usually comprising a small rubber tire carrying razor type chopping blades. Glass fibers, in the form of continuous strand, are fed to the chopper, which cuts the strand into separate one to two inch long strings, which are then sprayed into the resin and thence onto the surface being coated.

One of the disadvantages to spraying glass fibers along with resin onto a mold, sheet or the like, is that the short fiber strings do not lay flat on the coating surface. Instead, many of the fiber ends protrude above the coating surface, and it becomes necessary after application of the coating to roll the glass strings or "hairs" down so that they become completely encased and lay smooth in the resin coating. It is not unusual for a single spray gun operator applying a glass fiber reinforced resin coating to be followed by two or three roller operators smoothing down the glass "hairs" protruding from the wet coating to thereby render the final product of acceptable quality.

Another inherent disadvantage in resin-glass fiber spraying systems is that substantial labor costs are often involved just in handling the large quantities of resin and glass fibers needed to form the product. For example, a spray gun operator laying up a large boat must use perhaps 500 pounds of glass fibers, which are conventionally available in strand form in approximately 35 pound spools. So the operator must handle and sequentially use up 10 or 15 such spools, each of which must be replaced with another when used, along with perhaps 1000–1200 pounds of resin. Then, there are the problems encountered when the chopper becomes dull through use. Periodically the chopper blades and rubber tires must be replaced. Often the operator will either run out of glass fibers in the middle of the job or the chopper will clog up. Inevitably, some resin will get onto the glass strand being pulled through the chopper, which resin dampens the rubber tire, and then the gun no longer sprays out resin and clogs up. The operator then must shut down the spray gun, take it apart, remove the glass strand from inside the gun, reassemble the gun and start up again. All of this is very time consuming and adds appreciably to the cost of manufacturing glass fiber reinforced resin articles.

Stayner et al. U.S. Pat. No. 3,920,603 disclosed resinous compositions which could readily be applied to a mold, or to a vacuum or otherwise formed thermoplastic sheet, without use of glass fibers or a chopper gun, and without the need for time consuming and laborious rolling of a freshly applied resin surface to remove the "hairs". These compositions includes (A) 10 to 60% by weight of synthetic resin, and
(B) Reinforcing fillers comprising:
  (1) 1 to 30% by weight of glass spheres,
  (2) 10 to 60% by weight of Suzorite mica platelets, and
  (3) 20 to 70% by weight of aluminum trihydrate particles.

As there described, it was found that such compositions, which contained 20 to 70% by weight of aluminum trihydrate particles, had properties of high fire retardancy and low smoke generation.

It is a principal object of the present invention to provide improved reinforced resin compositions for coatings, and for forming articles thereof, which do not include aluminum trihydrate particles, and yet which have surprising fire retardancy and smoke absorbency properties.

An ancillary object of the invention is to provide such reinforced resin compositions which attain improved compatibility between resin and reinforcing fillers. A related object is to provide reinforced resin compositions having improved surface hardness properties, and yet which may be compounded at relatively low cost.

While the invention will be described in connection with certain preferred embodiments, it will be understood that I do not intend to limit the invention to those embodiments. On the contrary, I intend to cover all alternatives, modifications and equivalents as may be included within the spirit and scope of the invention.

In carrying out the invention, I have found that a special combination of filler materials — not including aluminum trihydrate particles — added to the resin in particular ratios, imparts to the filled resinous composition improved physical properties and brings about a significant reduction in costs of manufacture. The improved resinous compositions of the invention, including the particular reinforcing filler materials and proportions employed, are as follows:

(A) 10 to 60% by weight of synthetic resin, and
(B) Reinforcing fillers comprising:
  (1) 1 to 30% by weight of glass spheres,
  (2) 10 to 60% by weight of Suzorite mica platelets and
  (3) 20 to 70% by weight of silica flour.

Any of various general purpose curable synthetic polyester resins may be used in carrying out the invention. I prefer to employ rigid, thixotropic resins which are curable at room temperatures and become rigid after curing. Particularly useful are low viscosity resins of this type which permit high filling concentrations, and which contain a compatible solvent which will render thermoplastic materials, such as acrylic sheets, acceptable to a molecular bond with the resin, so that the resin will readily adhere to the thermoplastic material.

For example I have successfully used the styrene modified polyester resins marketed by Reichhold Chemicals, Inc. known as 94-169, 94-176 and 33-082. The 94-169 resin, when filled with the silica flour and other reinforcing materials described herein, is found to have high fire retardancy and low smoke generation. Prior to filling with reinforcing materials, this resin has a viscosity of about 100 centipoise, and a specific gravity of 1.09–1.12; after filling, the viscosity increases to the 1000–1200 centipoise range and the specific gravity to 1.50–1.54. As such, the filled resin may readily be applied to a mold or article to be coated using conventional spraying equipment, such as with a "Glas-Craft" gun.

The 94-176 and 33-082 resins both possess superior bonding properties when used to coat an acrylic sheet, and the latter resin may also be used in conventional lay up applications using a gelcoat mold. Combinations of resins may be employed, if desired, to achieve optimum combinations of the characteristics of each resin.

A particular type of mica described in U.S. Pat. No. 3,920,603 has been found to be useful in carrying out the invention. It is classified as a phlogopite mica, and the high purity ore from which it is obtained is known as Suzorite ore. Suzorite mica has a specific gravity of 2.72, a Mohs hardness of 2.5 to 3.0, a refractive index of 1.598, a very high melting point of 2960° F, an oil absorption (ASTM D281-31) of 41.5, a pH of 6.8–7.2, and is light buff in color. Its chemical analysis is as follows (in weight percentages):

| | |
|---|---|
| $SiO_2$ | 40.74 |
| $Al_2O_3$ | 15.79 |
| MgO | 20.56 |
| FeO | 7.83 |
| CaO | 0.00 |
| BaO | 0.45 |
| $TiO_2$ | 0.42 |
| $Cr_2O_3$ | 0.14 |
| MnO | 0.07 |
| $K_2O$ | 9.96 |
| $Na_2O$ | 0.46 |
| F | 2.16 |
| $H_2O+$ | 0.01 Molecular |
| $H_2O-$ | 0.01 Hygroscopic |

For use in practicing the invention, the Suzorite mica takes the form of highly uniform platelets about 1/16 inch long and having an aspect ratio, i.e., a length to thickness ratio, of from 30 to 1 up to about 180 to 1. Preferably, I employ a mixture of about 80% by weight of platelets screen sized −20+35, having a bulk density of 16.12 lb. per cu. ft., and with an aspect ratio of 30 to 1 up to 60 to 1, and 20% by weight of platelets screen sized −35+100, having a bulk density of 10.40 lb. per cu. ft., and with a very high aspect ratio of 80 to 1 up to about 160 to 1. I have found that this mixture of Suzorite mica platelets desirably imparts to the resin a very high modulus of elasticity and high tensile strength compared with that imparted by other materials such as glass flakes. This means that less mica may be used in the overall resin composition without sacrificing elasticity and strength properties. The mica platelets also possess excellent oblative properties, being sound and heat reflective, and thus lend excellent acoustical and fire retardancy qualities to the resin composition. In some compositions of the invention I have found it possible to reduce the content of mica platelets by adding a minor amount of glass flakes, for example flat sized in the range of 0.028–0.056 inches and having thicknesses averaging about 0.003–0.006 inches.

One of the disadvantages to use of conventional platelet type fillers in resin compositions is that the platelets tend to spontaneously align themselves in flat planes within the resin. This results in disparate responses of the resin to stress concentrations, depending upon the direction of the source of stress in relation to the planar orientation of the platelets.

In keeping with the invention, the silica flour particles constitute an important filler ingredient in my compositions. Their primary function is to improve compatibility between filler and resin and reduce cost of the composition, while at the same time affording desirable fire retardancy and smoke absorbency characteristics. Various particle sizes of silica flour may be employed. I prefer to use silica sand or flour having rounded rather than angular grain shapes, and having the following screen sizing:

98% through U.S. No. 325
2% retained on U.S. No. 325
Trace retained on U.S. No. 270

Its typical chemical composition is:

| | |
|---|---|
| Silica | 99.88% by wt. |
| Iron Oxide | .02 |
| Aluminum Oxide | .10 |
| Titanium Dioxide | .015 |
| Calcium Oxide | .01 |
| Magnesium Oxide | .005 |

I have successfully used such materials marketed by Wedron Silica Division, Del Monte Properties Company, Wedron, Ill., and known as Ground Foundry Sand (Flour) 400M.

I avoid the uneven stress distribution problem mentioned above by also incorporating into the resin composite a minor proportion by weight of microscopically sized glass spheres, which are about 6 to 50 microns in diameter, with an average diameter of 30 microns. It is found that the Suzorite mica platelets, tiny glass spheres and silica flour particles interact in the resin composition in a most effective way to bring about uniform stress distribution within the final reinforced resin composition.

I have found that by adding these particular reinforcing fillers together in the proper ratios, and then adding them to the resin, I am able to obtain a filled resin material in the 1200 centipoise viscosity range, which means that any glass fiber spray up gun conventionally used in the industry may readily be converted to the spraying of my new resin composition. And I found that my compositions when cured had excellent oblative properties, since the mica platelets act as a heat reflective material (as well as for strength reinforcement) and the silica flour retards burning. The glass spheres impart superior stress distribution to the cured composition, resulting in high impact strength, a high strength to weight ratio, a high modulus of elasticity, and a high tensile strength.

By coating my resin compositions onto a thermoplastic sheet I arrive at a laminate having unique fire retardancy and structural strength properties, yet still retaining the superior outdoor weatherability and decorativeness of the thermoplastic, and without losing the ease of mass production of the thermoplastic in the vacuum forming process.

Those skilled in the art will be able to select particular compositions from the ranges set forth above for particular end uses. That is, depending upon what properties are desired in the final product, the quantities of filler ingredients and the quantity of resin may be selected as desired.

Normally, for spray applications it is desirable for the resin to comprise about 30 to about 60 percent by weight of the composition. Since the thixotropicity of the composition increases as the resin content decreases, I find that my compositions are no longer sprayable in the 20 to 10 percent resin range; however these compositions act much like plaster or cement and are trowelable. They find use, for example, for concrete patching (where high compression value is important) or for protecting non-combustible structural materials in buildings. High silica flour and mica platelet contents, and a low resin content in my composition, result in a material which may be troweled on a structural steel beam to provide heat protection. Such a material has superior ablative qualities, and the low resin content assures a low fuel contribution to the fire.

The glass spheres, present in amounts varying from about 1 to about 30 percent by weight of the composition, function to provide stress distribution and compression value, since they are round, solid spheres. The higher the proportion of glass spheres, the more stress distribution will be obtained and the greater the compression value in the resin composition.

The Suzorite mica platelets, present in amounts varying from about 10 to about 60 weight percent, act as an ablative as well as an acoustical material, since the platelets reflect much like fish scales. Thus, increasing the mica platelets will increase tensile strength and modulus of elasticity in the composition, while perhaps sacrificing some properties in compression strength.

The silica flour particles may vary from about 20 to about 70 percent by weight of the composition. Increasing the silica flour content increases the fire retardancy of the composition, and increases its final surface hardness.

The following compositions, identified as compositions A, B, and C, are examples of my invention. In each instance the percentages by weight of the particular resins and reinforcing filler ingredients shown in the table were mixed together to form filled resin compositions, which were then sprayed onto a thermoplastic sheet which had been vacuum formed to a desired shape, and the compositions were air cured to produce a final laminated article.

| | Examples of Resinous Compositions Percentages by Weight | | |
|---|---|---|---|
| | A | B | C |
| Resin 94–169 | 33 | | |
| 94–176 | | 61 | |
| 33– 82 | | | 56 |
| Glass spheres | 2 | 1 | 1 |
| Suzorite mica platelets | 30 | 17 | 10 |
| Glass flakes | — | — | 10 |
| Silica flour particles | 35 | 21 | 23 |

Each of the resulting coatings formed of the compositions A, B and C was found to possess the desirable combination of properties described herein, including ready sprayability without need for rolling, improved flexibility while not detrimentally sacrificing other strength properties, superior stress distribution and fire retardancy properties. Composition A is a low viscosity, all purpose sprayable reinforced resin having a Class C fire rating. Composition B is particularly useful for bonding to an acrylic resin sheet. Composition C has high impact strength will readily bond to an acrylic resin sheet, and also may be sprayed onto a conventional gelcoat mold.

In preparing my resin compositions, I dry blend the mixture of filler ingredients first. Then I add the dry blend, either immediately or at some later time, to the resin. The dry blend is prepared by placing all of the Suzorite mica platelets in a tumbler, then adding the silica flour and glass spheres to the tumbler. The tumbler is rotated to mix the ingredients. A paddle type mixer may be used if desired.

After the solid fillers have been intimately mixed together, they are ready for mixing with the resin. Any suitable mixing arrangement may be used to blend the fillers in with the resin. Care should be taken to avoid trapping microscopic air in the resin mixture. In some instances it may be desirable to add a suitable agent capable of adding to the thixotropicity of the resin, to render the composition easier to apply to a vertical surface for example. Pigments may be added, if desired, to provide a given color in the final composition.

I have found that the filled resin compositions of the invention have excellent shelf stability, i.e. the fillers do not settle out over a period of time, even though the proportion of fillers to resin is high.

As is the case with the inventions disclosed in U.S. Pat. No. 3,920,603, one of the advantageous features of this invention is that the resin composition described herein does not require glass fiber strings for reinforcement. Accordingly it is no longer necessary for the spray operator to roll "hairs" (glass fibers) down after application of the composition to a mold or sheet surface. This results in significant savings in time and expense in forming resin coated articles. Neither is it necessary to employ a glass fiber chopper gun in practicing the invention, thereby avoiding the expense of such a gun and the consequent time consuming and laborious tasks of cleaning the gun after clogging.

The reinforced resin compositions of the invention have a wide variety of applications. One of the most important general applications is to enhance the properties of a thermoplastic sheet by applying to it a coating of the reinforced resin compositions of the invention. Such a thermoplastic sheet normally becomes flaccid upon being heated; but upon being coated with our resin compositions the sheet can be rendered virtually impervious to heat.

In addition, thermoplastic sheets that have high impact strength are normally pliable and have a low modulus of elasticity. Such sheets can be rendered rigid, with a high modulus of elasticity, upon being coated with our resins, without sacrificing impact properties. Other types of thermoplastic sheets that are highly brittle, but have desirable characteristics such as outdoor weatherability, may be coated with my resins to impart additional impact strength and other properties to the thermoplastic. My invention described herein is equally applicable to the exemplary uses and applications described in col. 7, lines 16 et seq. of U.S. Pat. No. 3,920,603.

From the above description it will be seen that my invention omits aluminum trihydrate particles heretofore thought to be essential to provide fire retardancy, and instead utilizes finely divided silica flour particles having round grain shapes to accomplish goals unattainable with the aluminum trihydrate. These goals include improved resin compatibility and better surface hardness of the finished product. Yet, my new compositions retain the fire retardancy properties of the compositions disclosed in U.S. Pat. No. 3,920,603.

I claim as my invention:

1. A hardenable composition consisting essentially of about 10 to 60 percent by weight of a curable, synthetic polyester resin, about 1 to 30 percent by weight of microscopically sized glass spheres, about 10 to 60 percent by weight of Suzorite mica platelets, and about 20 to 70 percent by weight of silica flour particles.

2. The composition of claim 1 in which the glass spheres have an average diameter of about 30 microns and the mica platelets are sized $-20+100$ mesh.

3. The composition of claim 2 in which the silica flour particles are sized 98% by weight through a U.S. No. 325 screen and about 2% by weight retained on said screen.

4. The composition of claim 1 in which the percentage of resin is about 30, the percentage of glass spheres is about 2, the percentage of mica platelets is about 30, and the percentage of silica flour particles is about 35.

5. The composition of claim 1 in which the percentage of resin is about 60, the percentage of glass spheres is about 1, the percentage of mica platelets is about 10–20, and the percentage of silica flour particles is about 20.

* * * * *